United States Patent
Bao et al.

(10) Patent No.: US 7,233,782 B2
(45) Date of Patent: Jun. 19, 2007

(54) METHOD OF GENERATING AN AUTHENTICATION

(75) Inventors: Feng Bao, Singapore (SG); Jianying Zhou, Singapore (SG); Huijie Deng, Singapore (SG)

(73) Assignee: Agency For Science, Technology and Research, Singapore (SG)

( * ) Notice: Subject to any disclaimer, the term of this patent is extended or adjusted under 35 U.S.C. 154(b) by 103 days.

(21) Appl. No.: 10/524,260

(22) PCT Filed: Aug. 14, 2002

(86) PCT No.: PCT/SG02/00185

§ 371 (c)(1),
(2), (4) Date: Feb. 11, 2005

(87) PCT Pub. No.: WO2004/021719

PCT Pub. Date: Mar. 11, 2004

(65) Prior Publication Data

US 2005/0246769 A1    Nov. 3, 2005

(51) Int. Cl.
*H04K 1/00* (2006.01)
(52) U.S. Cl. .............. 455/404.2; 455/407; 455/411; 726/16; 713/182
(58) Field of Classification Search ............. 455/411, 455/404.2, 407; 709/238, 245; 713/155, 713/182; 726/16
See application file for complete search history.

(56) References Cited

U.S. PATENT DOCUMENTS 6,470,447 B1 * 10/2002 Lambert et al. ............. 713/151

| 2001/0055394 | A1 | 12/2001 | Vanttinen et al. | |
|---|---|---|---|---|
| 2001/0056541 | A1 * | 12/2001 | Matsuzaki et al. | 713/193 |
| 2002/0026527 | A1 * | 2/2002 | Das et al. | 709/245 |
| 2003/0115452 | A1 * | 6/2003 | Sandhu et al. | 713/155 |
| 2004/0024901 | A1 * | 2/2004 | Agrawal et al. | 709/238 |

FOREIGN PATENT DOCUMENTS

| EP | 1158826 | 11/2001 |
|---|---|---|
| GB | 2367454 | 4/2002 |
| WO | 02/49280 | 6/2002 |

OTHER PUBLICATIONS

Chapter 9 of the Publication, "Network Security—Private Communication in A Public World", by Kaufman et al., published by PTR Prentice Hall, Englewoor Cliffs, NJ, 1995.

* cited by examiner

*Primary Examiner*—Joseph Feild
*Assistant Examiner*—Michael T. Vu
(74) *Attorney, Agent, or Firm*—Greenblum & Berstein, P.L.C.

(57) ABSTRACT

A method of generating an authentication for updating a mobile communications device's 40 location to a second communications device 60 is disclosed herein. The mobile communications device 40 is registered to a home network 30 comprising a proxy server but roams to a foreign network 40 with a different network number. The method proposes that, at the time of performing the location update, the second communications device and the proxy server each provides an input to a hash function to generate a shared secret; and using the shared secret as the authentication when the proxy server or the mobile communications device transmits the location update to the second communications device.

16 Claims, 2 Drawing Sheets

METHOD OF GENERATING AN AUTHENTICATION

BACKGROUND AND FIELD OF THE INVENTION

This invention relates to a method of generating an authentication for updating a mobile communications device's location.

Mobile networking along with the proliferation of wireless devices, such as notebook computers, personal digital assistants and cellular phones are gaining popularity. In mobile networking, a mobile communications device or a mobile device roams between an inter-connected network or inter-network to access or retrieve the desired information and it is imperative that the communication session is not disrupted during the roaming process. When the mobile device roams or switches between networks, its "point of attachment" to the inter-network changes which is invisible to the user since the hand-offs and reconnections occur automatically and seamlessly.

In a typical packet switched inter-network, such as the Internet, data packets are routed from a source inter-network address to a destination inter-network address according to a network number derived from the destination inter-network address by masking off some of the low-order bits. Thus, an inter-network address typically carries information that specifies a device's point of attachment according to the network number. To maintain existing higher-layer connections and to prevent communications breakdown as the mobile device moves from place to place, and thus between networks, the mobile device should keep its inter-network address the same. However, this is not possible since the correct delivery of packets to the mobile device's current point of attachment depends on the network number contained within the mobile device's inter-network address, which changes at new points of attachment i.e. when the mobile device moves between networks.

If a communications device wishes to send a data packet to the mobile device and is not updated of the new location or point of attachment of the mobile device, the data packet destined for the mobile device may be lost and thus communication would be disrupted. Therefore, to change the routing requires a new inter-network address associated with the new point of attachment.

To overcome the above problem, it has been proposed that the mobile device uses two Inter-network addresses: a home inter-network address (HIA) which is static and used to maintain reachability and connection even when the mobile device is away from the home inter-network, and a care-of inter-network address (CoA) which changes at each new point of attachment and can be regarded as the mobile device's topological significant address. The CoA indicates the new network number and thus identifies the mobile device's point of attachment with respect to the network topology. To maintain continuous network connection, the home network includes a proxy server which receives data messages on behalf of the mobile device and thereafter routes the data message to the mobile device based on the new CoA so that the communications session is not disrupted. The home network proxy server makes it appear that the mobile device is continually receiving data on its home network but in actual fact, the data is being routed to the new network specified by the CoA.

Alternatively, when the mobile device acquires a new CoA from the new network, the mobile device sends a location update message to its corresponding communications devices informing them of its new CoA. This will allow the corresponding communications devices to send messages using the new CoA to the mobile device. However, upon receiving the update message, a communications device, must verify the authenticity of the location update message before it starts sending messages to the mobile device at the new CoA. Authentication of the location update message is required since a hacker can impersonate the mobile device by sending a location update message with a CoA of his choice such that the corresponding device is bluffed into sending packets to the hacker instead of the mobile device.

Most of the authentication methods or protocols in the prior art proposed that the parties concerned pre-share a secret key or recognise each other's public key (see C. Kaufman, R. Perlman, and M. Speciner, *Network Security—Private Communication in A Public World*, PTR Prentice Hall, Englewoor Cliffs, N.J., 1995). Sharing a secret key between a mobile device and a random corresponding device in a large inter-connected network such as the Internet is unrealistic and complex. In addition, it is unlikely that a global public key infrastructure over the Internet will take place in the near future.

It is an object of the invention to provide a method of generating an authentication which alleviates at least one of the disadvantages of the prior art.

SUMMARY OF THE INVENTION

In a first aspect of the invention, there is provided a method of generating an authentication for updating a mobile communications device's location to a second communications device, the mobile communications device being registered to a proxy server, the method comprising the steps of, at the time of performing the location update,
  i. providing a first input from the proxy server and a second input from the second communications device to a first algorithm to generate a shared secret,
  ii. using the shared secret as the authentication when transmitting the location update to the second communications device.

Preferably, the first algorithm is a hash function and the hash of the first and second random numbers is the shared secret.

Typically, the mobile communications device has a device address which is part of an inter-network address, the device address is derived from a second algorithm using a cryptographic key associated with the mobile device as the input to the algorithm. Preferably, the second algorithm is a hash function and the hash of the cryptographic key is the device address of the mobile communications device.

In this way, the device address may be used as a form of identification between the second communications device and the proxy server and the mobile communications device may provide the device address and the cryptographic key to the second communications device so that the second communications device can verify the validity of the device address prior to providing the second input to the first algorithm.

Typically, the verification comprises the steps of: performing a hash of the received cryptographic key to obtain a digest, and comparing the digest of the hash function with the received address.

Preferably, the cryptographic key is a public key of an asymmetric key pair associated with the mobile communications device and the method may comprise the step of the second communications device sending an encrypted copy of the second input to the mobile communications device and encrypting the second input using the public key of the mobile device.

Preferably, the shared secret is used as an input to a third algorithm so that an output from the third algorithm is used subsequently as the authentication for updating the location update message. Typically, the third algorithm is a hash function. The authentication may be a hash of the concatenation of the shared secret and the location update message and the method may further comprise the step of transmitting the location update message together with the authentication to the second communications device. On receiving the authentication and the message, the second communications device may compute a hash of the concatenation of the shared secret and the received location update message for comparison with the received authentication. If the comparison matches, then the second communications device registers the new location of the mobile communications device and transmits any subsequent messages to the new location.

An advantage of the described embodiment of the invention is that the secret is only generated when a need arises to update the new location of the mobile communications device.

BRIEF DESCRIPTION OF THE DRAWINGS

An embodiment of the invention will now be described, by way of example, with reference to the accompanying drawings in which.

DETAILED DESCRIPTION OF THE PREFERRED EMBODIMENT

It will be appropriate to begin with some background on the concepts and terminology of cryptography. A cryptographic system, or cryptosystem, has an encryption key to transfer plaintext into ciphertext and a decryption key to recover the plaintext from ciphertext. If the encryption key and the decryption key are identical, the cryptosystem is called symmetric key cryptosystem. If the encryption key and the decryption key are different and it is computationally infeasible to determine the decryption key from the encryption key, the cryptosystem is called a public key cryptosystem.

In a public key cryptosystem, anyone can encrypt a message using the public key; however, only the holder of the corresponding private key can decrypt the ciphertext and recover the message.

Another form of cryptography is a collision resistant hash function or one-way hash function. Basically, a one-way hash function has the properties that 1) for any message m, it is easy to compute the hash of m which means that it should not take a lot of processing time; 2) given Hash(m), it is computationally infeasible to find message m i.e. a hash algorithm is not reversible; and 3) it is computationally infeasible to find two messages that hash to the same value.

Figure 1:
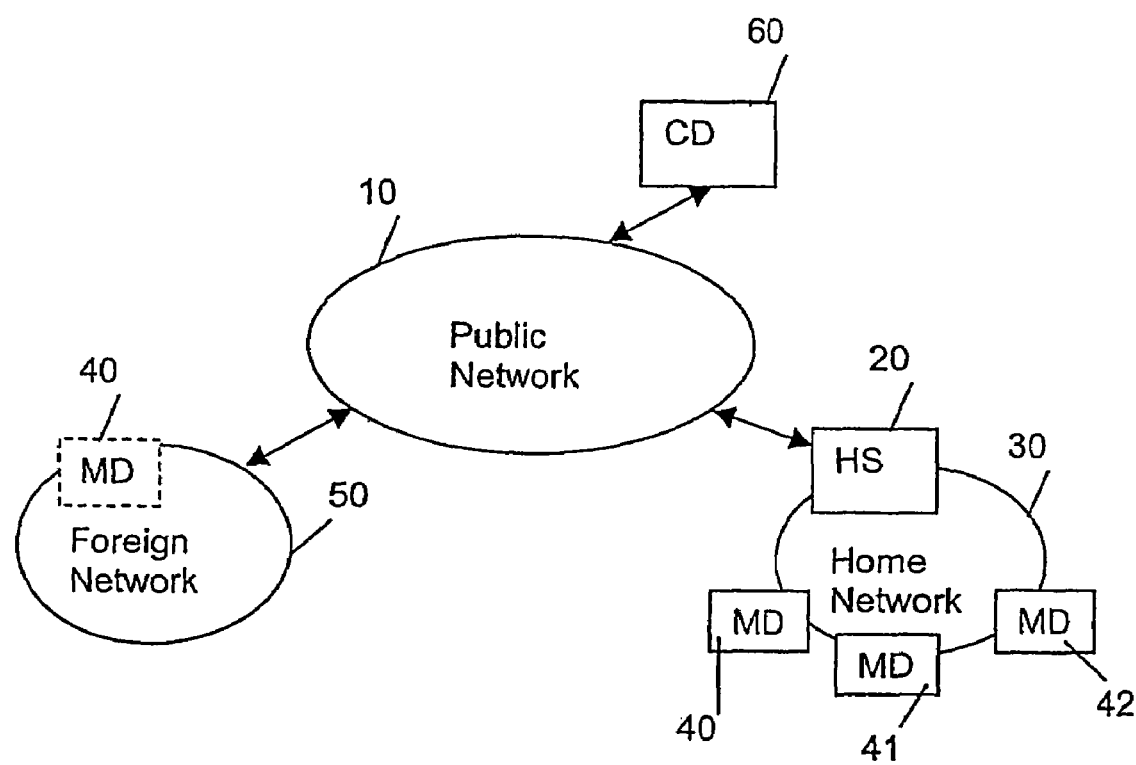
FIG. 1 shows a typical mobile networking system comprising a public network, a home network and a foreign network.

The following notation is used in this application:
$E(M)_{Public}$:encryption of a message M using a public key of a public key cryptographic system;
$E(M)_K$:encryption of a message M using a secret K of a symmetric key cryptographic system
X|Y:the concatenation of messages X and Y
Hashi( ):a collision resistant one-way hash function, i=1, 2, 3, 4
A→B:party A sends party B a message FIG. 1 shows a typical mobile networking system comprising a public network 10, a home network 30 and a foreign network 50. The public network 10 is assumed to be insecure and is thus subject to attacks by hackers. The home network 30 comprises a proxy server 20, which is associated with three mobile communications devices 40,41,42 registered with the home network 30 and each mobile device 40,41,42 is assigned a unique home inter-network address (HIA) for identification within the home network 30.

Examples of a mobile communications device include portable computers, laptops, PDAs, handheld electronic devices and other suitable devices that communicate wirelessly.

When one of the mobile devices 40 roams or is away from the home network 30 and is connected to a foreign network 50, the inter-network address changes since the mobile device 40 acquires a care-of network address (CoA) from the foreign network 50. The mobile device 40 then sends a location update message to the proxy server 20 using a conventional secure communication channel using a pre-shared secret key. The secure channel protects both the integrity and the confidentiality of messages delivered between the mobile device 40 and the proxy server 20. The mobile device 40 can also send a location update message to all corresponding communications devices 60 in the public network 10 but, as explained earlier, the corresponding communications device 60 needs some form of assurance that the location update message is indeed from the mobile device 40 before accepting the change since a hacker may have sent the update message impersonating the mobile device 40.

A corresponding communications device, in the context of this application, includes a server, a personal computer or another mobile communications device.

The authenticity of the location update messages from mobile device 40 needs to be verified by the corresponding device 60 before the corresponding device 60 can register the new location of the mobile device 40. The following embodiment describes how to authenticate a location update message efficiently without any pre-defined security associations between the corresponding device 60 and the mobile device 40 or the proxy server 20.

To enhance the network security, the proxy server 20 and the mobile device 40 may use an asymmetric key pair or a pre-shared secret key for encrypting messages transmitted between the proxy server 20 and the mobile device 40. In this way, a secure channel is achieved between the mobile device 40 and the proxy server 20.

As mentioned earlier, the HIA comprises the network number (Net_MD) which identifies which network the mobile device 40 is currently attached. The HIA also comprises the host address (Host_MD) which identifies the mobile device 40 uniquely in the home network. The HIA can thus be represented by:

HIA_MD=Net_MD|Host_MD

Since the public key associated with a mobile device is also unique, the public key can be used to identify the mobile device 40. Therefore the Host_MD can be derived from the public key. In this example, a hash of the public key is used to represent the Host_MD i.e. Host_MD=Hash1($MD_{public}$).

When a corresponding device 60 intends to send a data packet or message to the mobile device 40, the corresponding device 60 first checks its local cache to see if there is a location update entry, which has been authenticated previously, for the mobile device 40. If there is an authenticated valid entry, the corresponding device 60 sends the data packet to the CoA of the mobile device 40. If there is no location update entry, the corresponding device 60 and the proxy server 20 would engage in a message exchange as shown in FIG. 2.

At step 100, the corresponding device 60 sends a data packet PAC to the mobile device's 40 HIA. When the packet PAC arrives at the mobile device's home network 30, the packet PAC would be received by the proxy server 20 at step 110. At step 120, the proxy server 20 checks to see if the mobile device 40 is residing in the home network 30. If the mobile device 40 is in the home network 30, the packet PAC will be delivered to the mobile device 40 at step 130 and the process ends.

Figure 2:
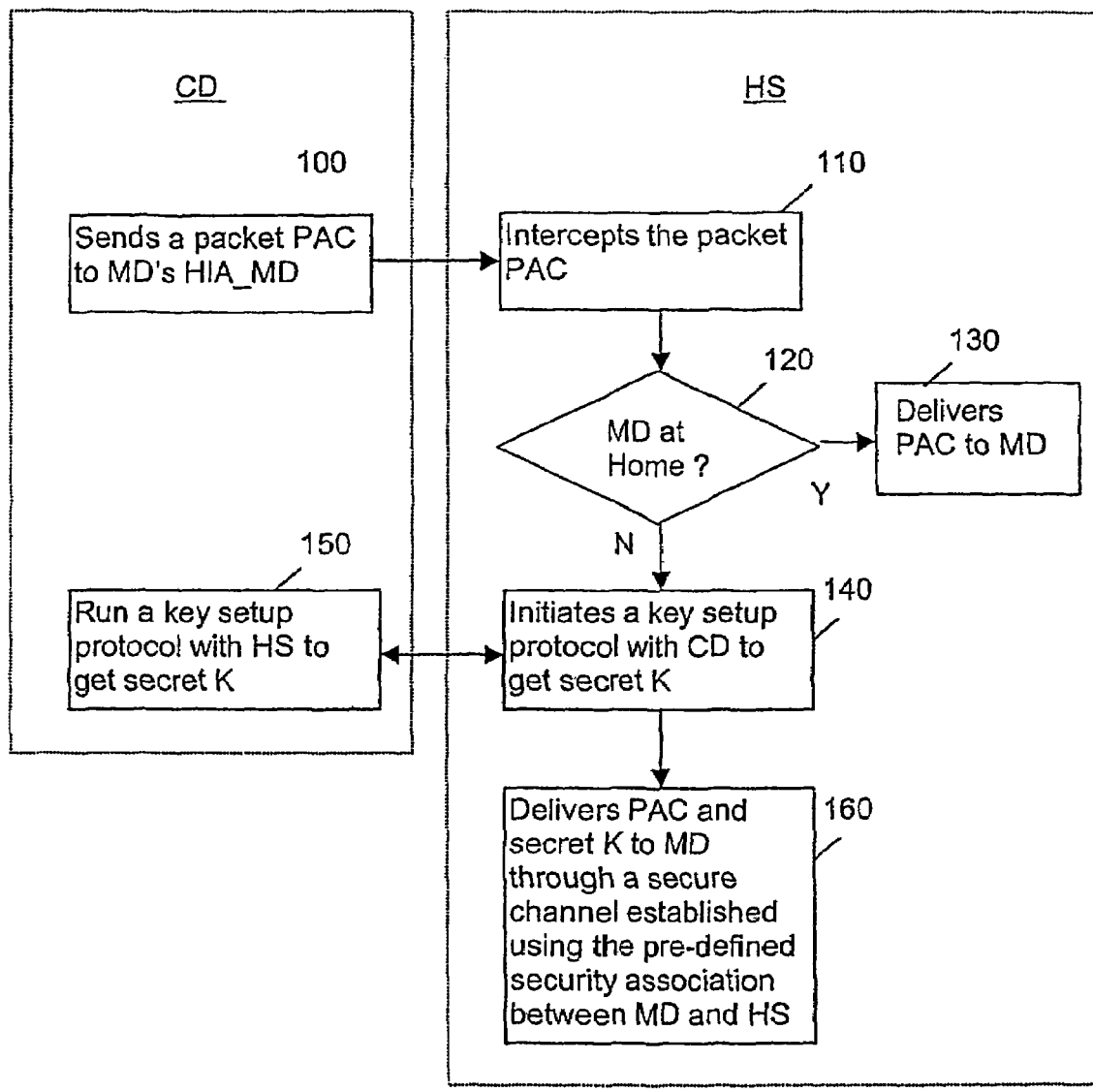
FIG. 2 is a flowchart showing the communications between a proxy server residing in the home network of FIG. 1 and a corresponding communications for generating a shared secret.

On the other hand, if the mobile device 40 is not located in the home network 30 the proxy server 20 initiates a "key setup protocol" with the corresponding device 60 at steps 140 and 150 of FIG. 2. Note that the proxy server 20 would have been notified of the new CoA of the mobile device 40 since the mobile device 40 would update the proxy server 20 whenever the CoA changes.

The key setup protocol makes use of a binding relationship between the public key $MD_{public}$ and the HIA of the mobile device 40:

HIA_MD=Net_MD|Host_MD, where Net_MD is the network number of the home 30 to which the mobile device 40 is connected and Host_MD=Hash1($MD_{public}$). The result of running the key setup protocol is that the home server 20 and corresponding device 60 share a secret K.

The example for this embodiment is a public key cryptosystem and thus the key setup protocol will be as follows:

1) HS→CD: M1=HIA_MD|$MD_{public}$|R1|NetMask
2) CD→MD: M2=E($MD_{public}$, R1, R2)
3) HS→CD: M3=Hash3(K|M1|M2|K)

The first step in the key setup protocol is initiating the key setup and this takes the form of the proxy server 20 sending a message M1 to the corresponding device 60. In this embodiment, the message M1 also consists of the inter-network address HIA_MD of the mobile device 40, the public key $MD_{public}$, and a random number R1 generated by the proxy server 20 and a Network Mask NetMask. The random number R1 acts as a challenge from the proxy server 20 to the corresponding device 60.

Upon receiving the message M1, the corresponding device 60 uses the network mask NetMask to extract the network number Net_MD and the host address Host_MD from the inter-network address HIA_MD. The corresponding device 60 then computes the digest of Hash1($MD_{public}$) and compares the digest with the actual host address Host_MD. If the comparison is different, the corresponding device 60 terminates the process. On the other hand, if the comparison is the same, the corresponding device 60 will know that the $MD_{public}$ is the public key associated with the mobile device's 40 home inter-network address HIA_MD.

The corresponding device 60 then proceeds to generate a second random number R2 and computes a secret K whereby K=Hash2(R1|R2), i.e. K is the hash of the concatenation of the two random numbers R1 and R2.

The corresponding device 60 then encrypts R2 using the mobile device's 40 public key $MD_{public}$ and sends a message M2=E($MD_{public}$, R2) to the HIA of the mobile device 40. When the message M2 arrives at the home network 30, the message M2 is again intercepted by the proxy server 20 which decrypts M2 using the corresponding private key $MD_{private}$ of the public key cryptosystem to obtain R2 and similarly computes the secret K using the same hash algorithm i.e. Hash2(R1|R2).

At this stage, the secret K is generated using the two random numbers R1 and R2 contributed by the proxy server 20 and the corresponding device 60 respectively. The proxy server 20 then sends an authentication code to the corresponding device 60. The authentication code can take the form of a third message M3 whereby M3=Hash3(K|M1|M2|K) and the message M3 is then sent to the corresponding device 60. In this example, the secret K is concatenated to both the front and the back of the messages M1 and M2 (which were transmitted previously to the corresponding device 60) and this serves to enhance the strength of the digest of the hash algorithm.

Upon reception of the message M3, the corresponding device 60 proceeds to compute the digest of Hash3(K|M1|M2|K) separately and compares it with the received message M3. Since the message M3 functions as a message authentication code, the digest can only be computed and verified by a party who knows the secret K. Therefore, if the digest computed by the corresponding device 60 is the same as the received message M3 then the corresponding device 60 will know that the mobile device 40 (and the proxy server 20) has received the secret K and will use the secret K for authenticating a location update message from the mobile device 40 in subsequent communications. Alternatively, if the digest computed from the hash and the received message M3 is different, then the corresponding device 60 will terminate the communication.

Note that as far as corresponding device 60 is concerned, the key setup protocol was performed with the mobile device 40 since the HIA of the mobile device 40 was used as the destination address. In fact, the key setup was performed with the proxy server 20 functioning as a security proxy for the mobile device 40 which is transparent to the corresponding device 60.

Having obtained the secret K, this will be used between the mobile device 40 and corresponding device 60 to authenticate location update messages, as will be described below.

Referring to FIG. 2 again, at step 160, the proxy server 20 forwards the data packet PAC received from the corresponding device 60 and forwards the packet PAC together with the secret K using the pre-defined secured medium to the mobile device 40. Note that it is imperative that the confidentiality of K must be protected during the delivering process from the proxy server 20 to the mobile device 40.

After receiving the packet PAC and the secret K, the mobile device 40 extracts the corresponding device's 60 inter-network address IA_CD from the data packet PAC and computes a location update message as follows:

M4=HIA_MD|CoA_MD|IA_CD|INTV, COUNT, MAC where CoA_MD is the mobile device's 40 new care-of inter-network address, INTV is the maximum valid interval which a corresponding device 60 can send data to the CoA_MD, COUNT is a counter which is used to counter reply of the message to detect replay of location update messages by a hacker, and MAC=message authentication code. The MAC in this example is in the following form:

Hash4(K|HIA_MD|CoA_MD|IA_CD|INTV, COUNT)

The mobile device 40 then sends the location update message M4 (which also includes the message authentication code) to the corresponding device 60. Upon receiving the message M4, the corresponding device 60 checks the validity of the message using the MAC as reference. Similar to the previous Hash digest, the corresponding device 60 proceeds to use the received message HIA_MD|CoA_MD|IA_CD|INTV, COUNT, minus the MAC, and separately computes the digest of the Hash4 function using its own secret K which has been calculated previously during the key setup process with the proxy server 20. If both digest are the same then the corresponding device 60 knows that the location update message is indeed valid and that the message came from the mobile device 40 and can safely update the mobile device's 40 CoA location in the location update cache table by recording the binding of the HIA_MD and the new CoA_MD, as well as the associated interval INTV. The authentication procedure is then completed. From this point on, the corresponding device 60 can continue to communicate with the mobile device 40 by sending messages directly to the mobile device's CoA_MD.

Using the above described embodiment, an advantage is that the secret K is generated when a need arises to update the new CoA of the mobile device 40. If the mobile device 40 roams to a different network such that the CoA changes again, the same procedure may be utilised to generated a new secret K since the corresponding device 60 and the proxy server 20 may provide a new input to generate a new random number. Therefore a new secret K can be used for the message authentication code thus enhancing the security of the mobile network system. Alternatively, since a secret key is already shared between the mobile device 40 and the corresponding device 60, the same secret key can be used to authenticate future location update messages which is more efficient.

The described embodiment should not be construed as limitative. For example, the secret K can be appended before and/or after a message when performing a hash algorithm using the secret as an input. After the key setup process and obtaining the secret K, the proxy server can proceed to update the CoA of the mobile device 40 by performing the same authentication procedure instead of sending the secret K to the mobile device 40.

Having now fully described the invention, it should be apparent to one of ordinary skill in the art that many modifications can be made hereto without departing from the scope as claimed.

The invention claimed is:

1. A method of generating an authentication for updating a mobile communications device's location to a second communications device, the mobile communications device being registered to a proxy server, the method comprising, when performing the location update, providing a first input from the proxy server and a second input from the second communications device to a first algorithm to generate a shared secret, and using the shared secret as the authentication when transmitting the location update to the second communications device, wherein the mobile communications device provides a device address and a cryptographic key to the second communications device, and the second communications device verifies the validity of the device address prior to providing the second input to the first algorithm.

2. A method according to claim 1, wherein the first algorithm is a hash function and wherein the shared secret is a hash of first and second random numbers.

3. A method according to claim 1, wherein the device address is derived from a second algorithm using the cryptographic key as an input, the cryptographic key being associated with the mobile device.

4. A method according to claim 3, wherein the second algorithm is a hash function and a hash of the cryptographic key is the device address of the mobile communications device.

5. A method according to claim 3, wherein the cryptographic key is a public key of an asymmetric key pair associated with the mobile communications device.

6. A method according to claim 5, wherein the second communications device sends an encrypted copy of the second input to the mobile communications device, the encryption being performed using the public key of the mobile device.

7. A method according to claim 1, wherein the verification comprises performing a hash of the cryptographic key to obtain a digest, and comparing the digest of the hash with the device address.

8. A method according to claim 1, further comprising using the shared secret as an input to a third algorithm, and obtaining an output from the third algorithm as the authentication.

9. A method according to claim 1, wherein the authentication is a hash of a concatenation of the shared secret and a location update message.

10. A method according to claim 9, further comprising transmitting the location update message together with the authentication to the second communications device.

11. A method according to claim 10, further comprising computing, by the second communications device, a hash of a concatenation of the shared secret and the location update message for comparison with the authentication.

12. A method according to claim 11, wherein if the authentication and the hash of the concatenation of the shared secret and the location update message are the same, the second communications device registers a new location of the mobile communications device and transmits subsequent messages to the new location.

13. A method according to claim 1, wherein the first input from the proxy server is a random number.

14. A method according to claim 1, wherein the second input from the second communications device is a random number.

15. A method according to claim 1, wherein the second communications device is mobile.

16. A method according to claim 1, wherein the second communications device has a fixed inter-network address.

* * * * *